United States Patent
Watarai et al.

(10) Patent No.: US 9,963,192 B2
(45) Date of Patent: May 8, 2018

(54) NON-METALLIC BRACKET FOR A BICYCLE HYDRAULIC COMPONENT

(71) Applicant: Shimano Inc., Sakai, Osaka (JP)

(72) Inventors: Etsuyoshi Watarai, Osaka (JP); Osamu Kariyama, Osaka (JP); Nobuyoshi Fujii, Osaka (JP)

(73) Assignee: Shimano Inc., Osaka (JP)

( * ) Notice: Subject to any disclaimer, the term of this patent is extended or adjusted under 35 U.S.C. 154(b) by 176 days.

(21) Appl. No.: 15/012,223

(22) Filed: Feb. 1, 2016

(65) Prior Publication Data
US 2017/0217533 A1 Aug. 3, 2017

(51) Int. Cl.
*B62L 3/02* (2006.01)
*B62K 23/06* (2006.01)

(52) U.S. Cl.
CPC ........... *B62L 3/023* (2013.01); *B62K 23/06* (2013.01)

(58) Field of Classification Search
CPC ...... B60T 17/043; B62L 3/023; F16L 29/005; F16L 33/224; B62M 9/122; B62M 9/132; B62M 25/08
USPC .......................................................... 60/594
See application file for complete search history.

(56) References Cited

U.S. PATENT DOCUMENTS

| | | | | |
|---|---|---|---|---|
| 6,481,756 B1* | 11/2002 | Field | ............... | F16L 29/005 |
| | | | | 285/120.1 |
| 6,527,303 B2* | 3/2003 | Kariyama | ............... | B60T 1/065 |
| | | | | 285/246 |
| 9,199,691 B2* | 12/2015 | Kariyama | ............ | F16L 29/005 |
| 9,227,692 B2* | 1/2016 | Kariyama | ............... | B62L 3/023 |
| 9,550,546 B2* | 1/2017 | Kariyama | ............... | B62L 3/023 |
| 2002/0093192 A1* | 7/2002 | Matkovich | .......... | A61M 39/1011 |
| | | | | 285/3 |
| 2005/0126331 A1* | 6/2005 | Dal Pra | ................. | B62K 23/02 |
| | | | | 74/558.5 |
| 2013/0277162 A1* | 10/2013 | Nago | .................... | B62K 23/06 |
| | | | | 188/344 |
| 2014/0038757 A1* | 2/2014 | Kariyama | ............ | B60T 17/043 |
| | | | | 474/101 |
| 2015/0000267 A1* | 1/2015 | Ruopp | .................... | B62L 3/023 |
| | | | | 60/592 |

FOREIGN PATENT DOCUMENTS

DE  601 14 169 T2  7/2006
EP  2 100 805 A1  9/2009

* cited by examiner

*Primary Examiner* — Thomas E Lazo
(74) *Attorney, Agent, or Firm* — Global IP Counselors, LLP (57) ABSTRACT

A non-metallic bracket for a bicycle hydraulic component is basically provided with a non-metallic body and a rupturing member. The non-metallic body has a hydraulic hose attachment port and an internal fluid passage. The hydraulic hose attachment port has an insertion opening disposed at an exterior surface of the non-metallic body and an internal attachment bore extending from the insertion opening towards the internal fluid passage. The rupturing member is disposed in the non-metallic body at a location spaced from the insertion opening of the hydraulic hose attachment port.

13 Claims, 7 Drawing Sheets

NON-METALLIC BRACKET FOR A BICYCLE HYDRAULIC COMPONENT

BACKGROUND

Field of the Invention

This invention generally relates to a non-metallic bracket for a bicycle hydraulic component. More specifically, the present invention relates to a non-metallic bracket for a bicycle hydraulic component including a rupturing member disposed in a non-metallic body.

Background Information

A hydraulic bicycle system is well known for connecting hydraulic components with a hydraulic hose. A first hydraulic component, such as a brake lever, is fluidly coupled to a second hydraulic component, such as a brake caliper, by the hydraulic hose. The second hydraulic component is hydraulically controlled by hydraulic fluid flowing through the hydraulic hose in response to operation of the first hydraulic component. The hydraulic hose is coupled to metallic bodies of the hydraulic components.

SUMMARY

Generally, the present disclosure is directed to various features of a non-metallic bracket for a bicycle hydraulic component. In one feature, a non-metallic bracket for a bicycle hydraulic component is provided in which a rupturing member is disposed in a non-metallic body of the non-metallic bracket.

In view of the state of the known technology and in accordance with a first aspect of the present disclosure, a non-metallic bracket for a bicycle hydraulic component is provided that basically comprises a non-metallic body and a rupturing member. The non-metallic body has a hydraulic hose attachment port and an internal fluid passage. The hydraulic hose attachment port has an insertion opening disposed at an exterior surface of the non-metallic body and an internal attachment bore extending from the insertion opening towards the internal fluid passage. The rupturing member is disposed in the non-metallic body at a location spaced from the insertion opening of the hydraulic hose attachment port.

In accordance with a second aspect of the present invention, the non-metallic bracket according to the first aspect is configured so that the rupturing member is a tubular rupturing needle having a fluid passage fluidly connecting the hose attachment port to the internal fluid passage.

In accordance with a third aspect of the present invention, the non-metallic bracket according to the second aspect is configured so that the tubular rupturing needle and the non-metallic body are a unitary one-piece member that is unitarily molded.

In accordance with a fourth aspect of the present invention, the non-metallic bracket according to the second aspect is configured so that the tubular rupturing needle is bonded to the non-metallic body.

In accordance with a fifth aspect of the present invention, the non-metallic bracket according to the second aspect is configured so that a tubular insert disposed in the hydraulic hose attachment port with the tubular rupturing needle supported on the non-metallic body by the tubular insert.

In accordance with a sixth aspect of the present invention, the non-metallic bracket according to the fifth aspect is configured so that the tubular insert is a metallic member.

In accordance with a seventh aspect of the present invention, the non-metallic bracket according to the fifth or sixth aspect is configured so that the tubular insert and the tubular rupturing needle are a unitary one piece member.

In accordance with an eighth aspect of the present invention, the non-metallic bracket according to the first to seventh aspects is configured so that the internal attachment bore of the hydraulic hose attachment port includes a screw thread portion.

In accordance with a ninth aspect of the present invention, the non-metallic bracket according to the first to eighth aspects is configured so that the non-metallic body further has a gripping portion and a handlebar receiving recess disposed at an end of the gripping portion.

In accordance with a tenth aspect of the present invention, the non-metallic bracket according to the ninth aspect is configured so that the non-metallic body further has a pommel portion disposed at an opposite end of the gripping portion from the handlebar receiving recess.

In accordance with an eleventh aspect of the present invention, the non-metallic bracket according to the ninth or tenth aspect is configured so that a bracket cover is overlying a gripping portion of the non-metallic body.

In accordance with a twelfth aspect of the present invention, the non-metallic bracket according to the eleventh aspect is configured so that the bracket cover is made of an elastic material.

In accordance with a thirteenth aspect of the present invention, the non-metallic bracket according to one of the first to twelfth aspects is configured so that the non-metallic body is made of a resin material.

In accordance with a fourteenth aspect of the present invention, a bicycle hydraulic actuating device includes the non-metallic bracket according to the first aspect. The bicycle hydraulic actuating device is configured to further include an operating member movably mounted to the non-metallic bracket and a piston operatively coupled to the operating member. The piston is movably disposed in a hydraulic chamber of the non-metallic bracket in response to operation of the operating member.

Also other objects, features, aspects and advantages of the disclosed non-metallic bracket will become apparent to those skilled in the art from the following detailed description, which, taken in conjunction with the annexed drawings, discloses one illustrative embodiment of the non-metallic bracket.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Figure 1:
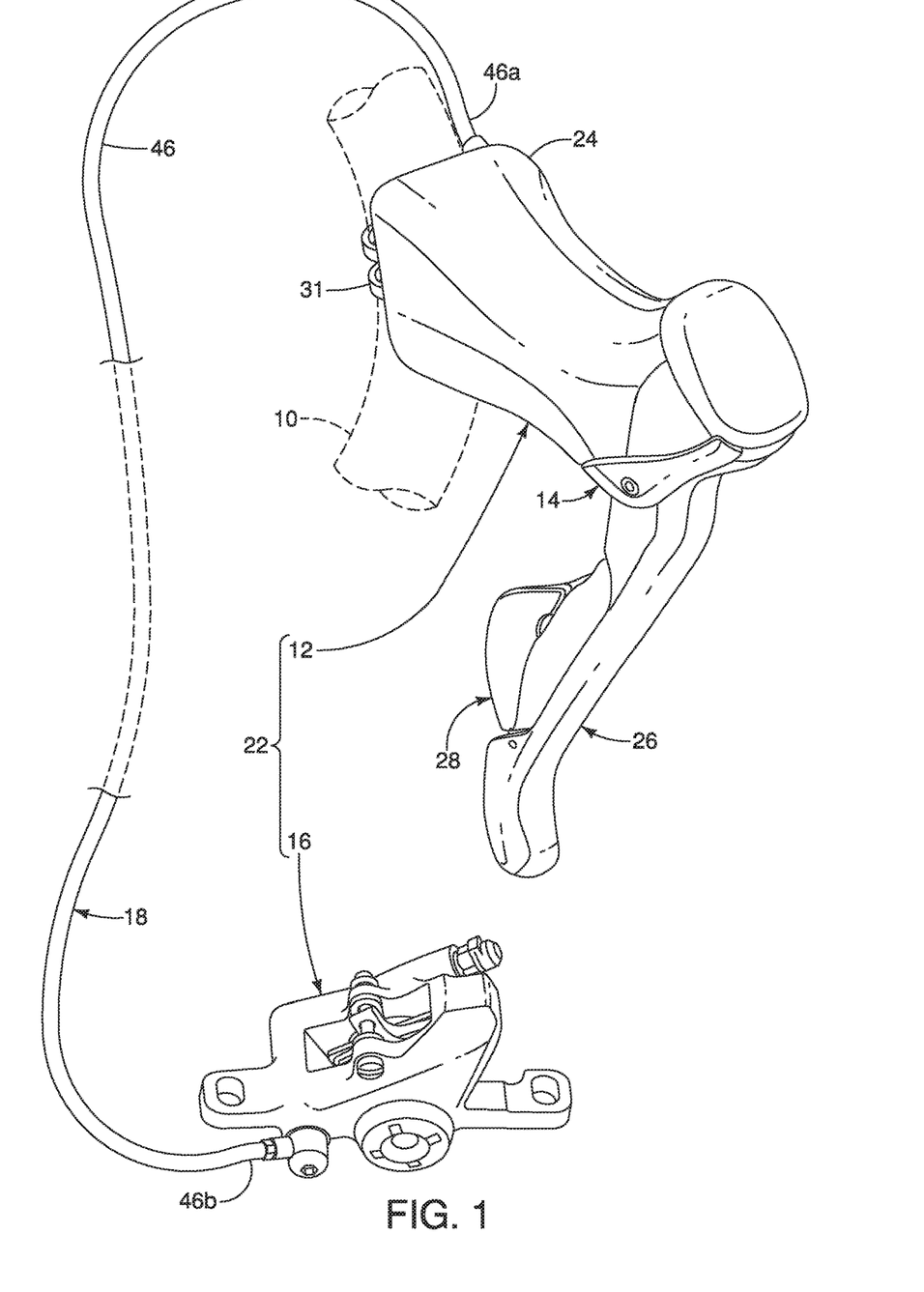
FIG. 1 is a perspective view of a portion of a bicycle handlebar that is equipped with a bicycle operating device having a non-metallic bracket in accordance with one illustrated embodiment.

Referring initially to FIG. 1, a portion of a bicycle handlebar 10 is illustrated that is equipped with a bicycle operating device 12 having a non-metallic bracket 14 in accordance with a first exemplary embodiment. Here, the bicycle operating device 12 is an example of a bicycle hydraulic component. More specifically, the bicycle operating device 12 of the first exemplary embodiment is a brake operating device (i.e., a bicycle hydraulic component) that is fluidly connected to a bicycle disc brake caliper 16 via a hydraulic hose structure 18.

Referring initially to FIG. 1, a hydraulic brake system 22 is illustrated that includes the bicycle operating device 12 operatively coupled with the hydraulic hose structure 18 (e.g., a hydraulic bicycle hose structure). The hydraulic hose structure 18 is prefilled with hydraulic fluid and sealed at each end so that the hydraulic brake system 22 can be assembled in a relatively easy manner without air being trapped in the hydraulic brake system 22.

The hydraulic brake system 22 includes a disc brake rotor (not shown) that is fixedly attached to a hub (not shown) of a bicycle wheel (not shown). The bicycle operating device 12 and the brake caliper 16 include conventional bicycle components that are hydraulically operated in a conventional manner, unless otherwise specified below. Because these components are conventional, they will not be discussed and/or illustrated in detail herein. Furthermore, the bicycle operating device 12 is installed to a bicycle. Bicycles and their various components are well-known in the prior art, and thus, the bicycles and its various components will not be discussed or illustrated in detail herein, except for the components of the bicycle operating device 12. In other words, only the bicycle operating device 12 will be discussed and illustrated in detail herein. Moreover, because most bicycle operating devices are well known to those skilled in the art, the bicycle operating device 12 will only be discussed and illustrated to the extent needed to understand the present disclosure.

As illustrated in FIG. 1, the bicycle operating device 12 includes the non-metallic bracket 14 and an operating member 26. The non-metallic bracket 14 is configured to be mounted to the bicycle handlebar 10. The operating member 26 is movably mounted to the non-metallic bracket 14 about pivot member 26a. As explained below, the operating member 26 is biased to a rest position with respect to the non-metallic bracket 14. The operating member 26 actuates the hydraulic brake system 22 upon movement of the operating member 26 relative to the non-metallic bracket 14 to perform a braking operation of the brake caliper 16 of the hydraulic brake system 22.

As seen in FIG. 1, the bicycle operating device 12 further includes a shift operating member 28. The shift operating member 28 is provided on the operating member 26 and is configured to be electrically connected to a bicycle electric component, such as a shifting device (not shown). The shift operating member 28 is configured to perform chain or gear shifting operations of the shifting device. Because various electrical shifting systems are known in the bicycle field, the shift operating member 28 will not be discussed herein for the sake of brevity.

Figure 2:
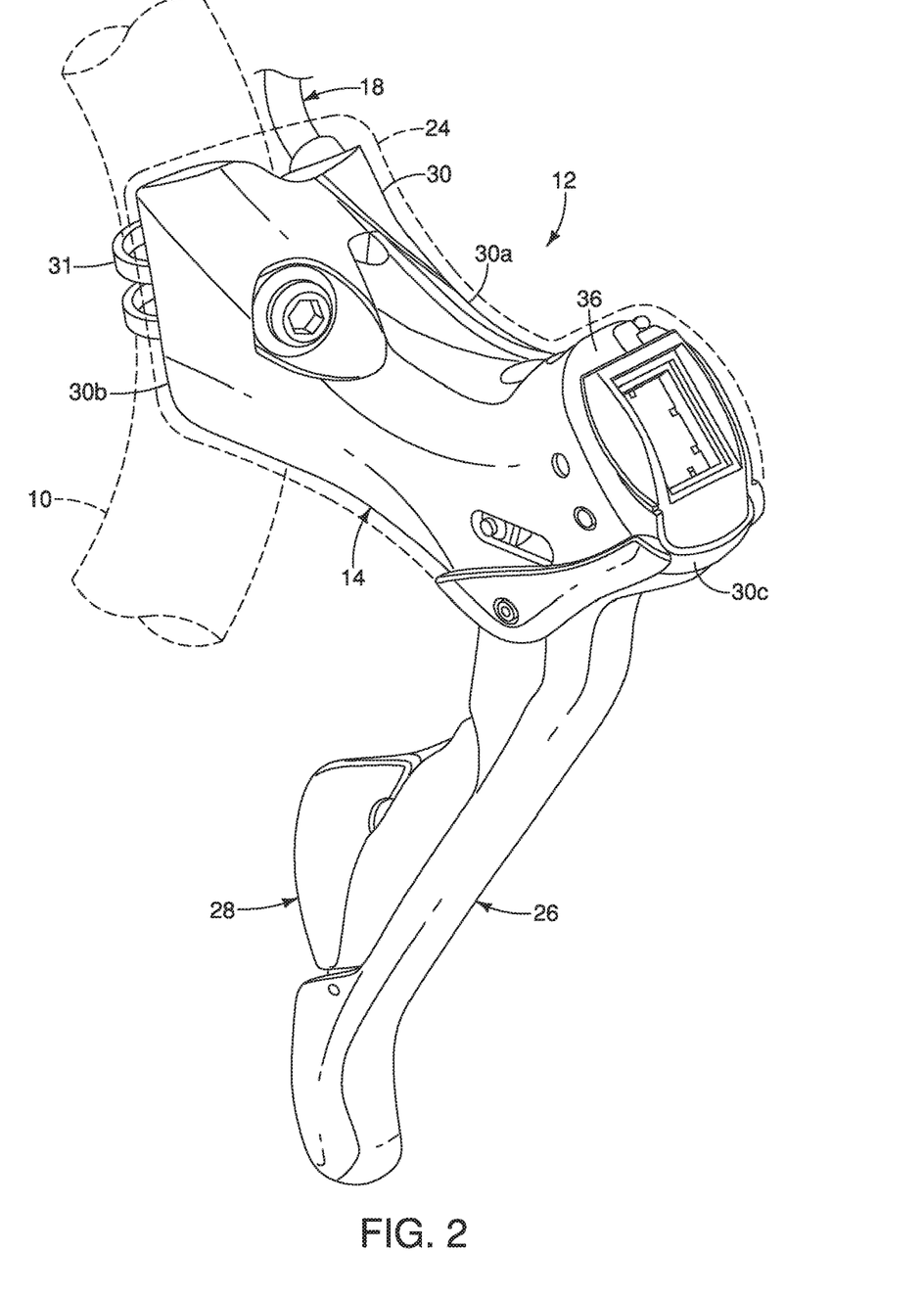
FIG. 2 is a perspective view of the bicycle operating device illustrated in FIG. 1 with a bracket cover shown in broken lines.

As shown in FIGS. 1 and 2, the non-metallic bracket 14 includes a non-metallic body 30 and an attachment member 31. The non-metallic body 30 basically has a gripping portion 30a. The attachment member 31 and the non-metallic body 30 are capable of clamping the handlebar 10 of the bicycle therebetween. The gripping portion 30a is configured to be gripped by a rider during riding. The attachment member 31 is a conventionally-known band-shaped member, and the bicycle operating device 12 can be fixed to the handlebar 10 by fastening the attachment member 31 with respect to the non-metallic body 30 by a screw.

Figure 3:
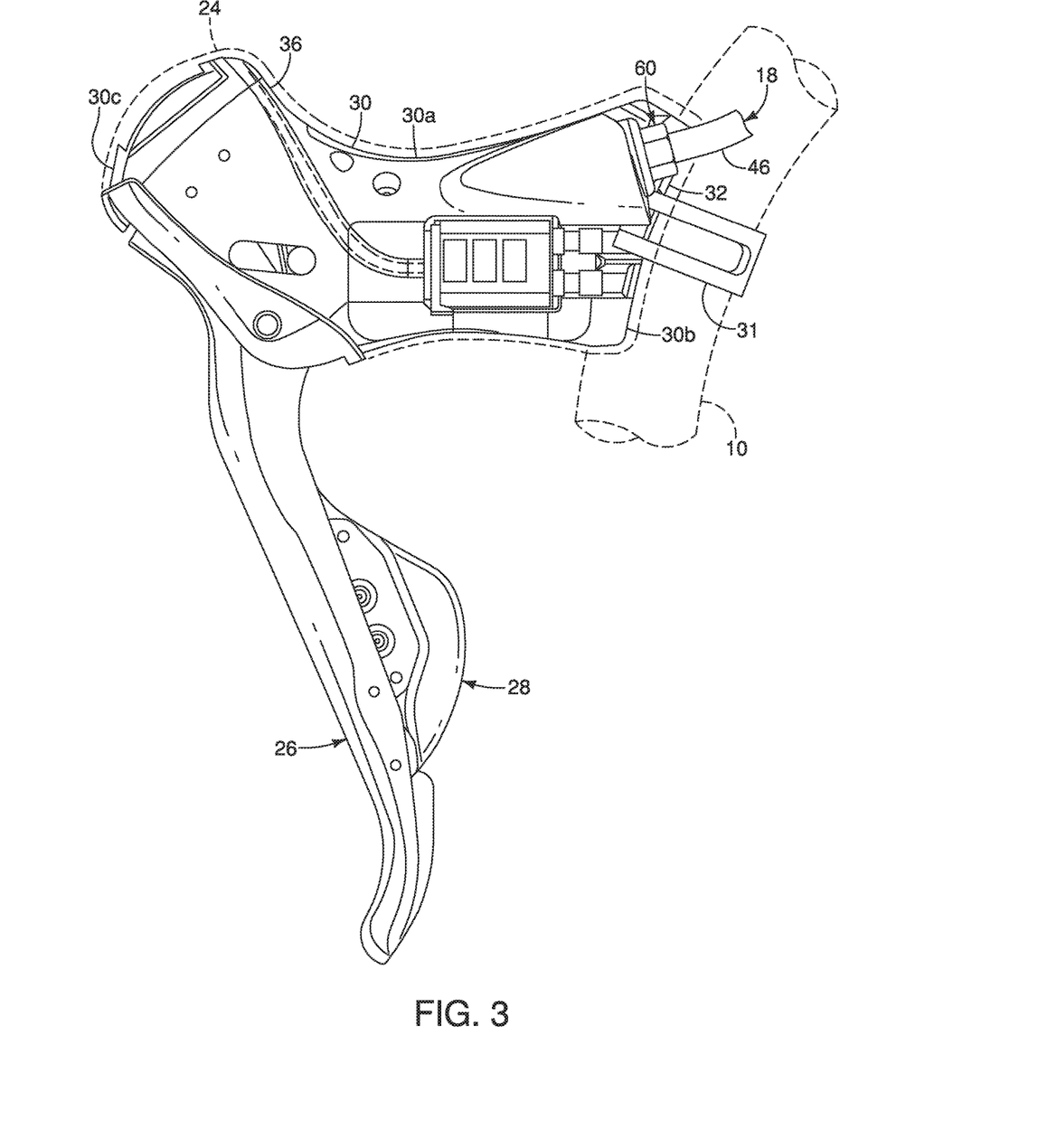
FIG. 3 is an elevational view of a portion of the non-metallic bracket of the bicycle operating device illustrated in FIGS. 1 and 2.
Figure 4:
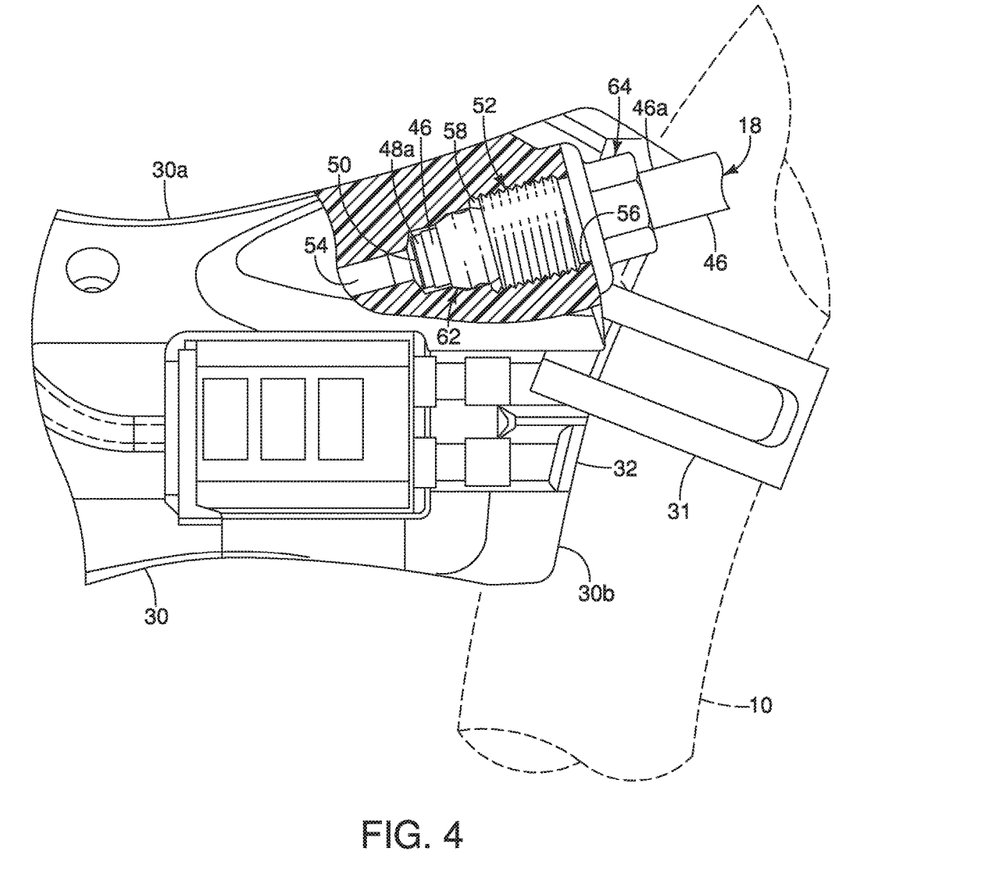
FIG. 4 is a partial cross sectional view of a hydraulic attachment port of the non-metallic bracket illustrated in FIGS. 1 to 3.

As shown in FIG. 3, the gripping portion 30b extends longitudinally between a first end 30b and a second end 30c of the non-metallic body 30. The non-metallic bracket 14 further includes a bracket cover overlying the gripping portion 30a of the non-metallic body 30. The gripping portion 30a is at least partially covered by the bracket cover 24. The non-metallic body 30 is made of a non-metallic material, such as a resin material. The bracket cover 24 is made of an elastic material, such as a rubber material. The bracket cover 24 overlies a gripping portion 30a of the non-metallic body 30. The bracket cover 24 is preferably removably attached to the non-metallic body 30.

The top or upper surface of the non-metallic body 30 has a downward-curving shaped surface to facilitate gripping of the gripping portion 30a by hand. A handlebar receiving recess 32 is formed on the first end 30b side of the non-metallic body 30. The handlebar receiving recess 32 is configured to curve to follow the curved part of the handlebar 10. The handlebar receiving recess 32 is disposed at an end of the gripping portion 30a of the non-metallic body 30. The gripping portion 30a of the non-metallic body 30 is disposed at a substantially middle portion of the non-metallic body 30. A pommel portion 36 is formed on the second end 30c side of the non-metallic body 30. In other words, the pommel portion 36 is disposed at an opposite end of the gripping portion 30a from the handlebar receiving recess 32 such that the gripping portion 30a is disposed between the handlebar receiving recess 32 and the pommel portion 36.

In the illustrated embodiment, the handlebar attachment member 31, the gripping portion 30a and the pommel portion 36 are integrally provided as a one-piece unitary member. Of course, the handlebar attachment member 31, the gripping portion 30a and the pommel portion 36 can have removable members as needed and/or desired.

As illustrated in FIGS. 1 and 2, the bracket cover 24 is stretched over the gripping portion 30a and at least part of the pommel portion 36 to provide a cushion to the gripping portion 30a of the non-metallic body 30 and to provide an attractive appearance. However, it will be apparent to those skilled in the bicycle field that the material of the bracket cover 24 is not limited to an elastic material and any appropriate material can be applied to the bracket cover 24 if needed and/or desired.

Figure 5:
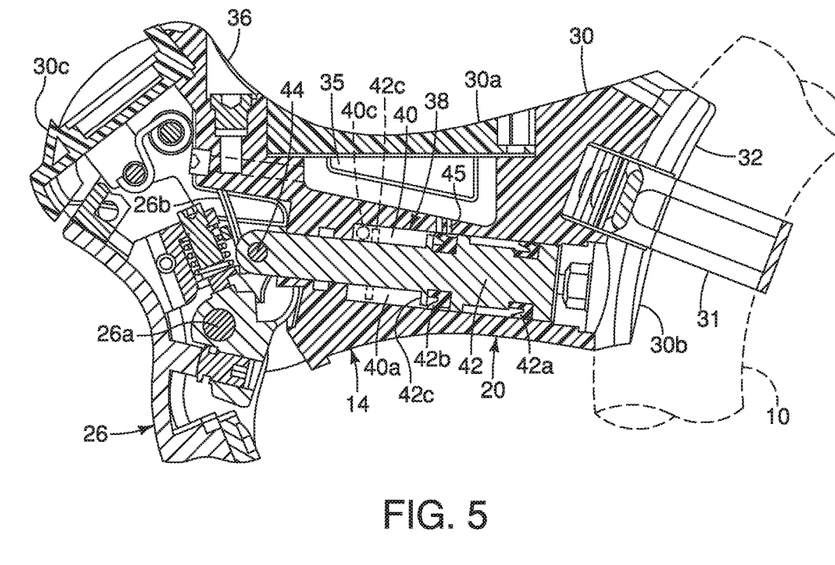
FIG. 5 is a is a center cross sectional view of the non-metallic bracket illustrated in FIGS. 1 to 3.

As shown in FIGS. 1 and 5, a hydraulic fluid pressure generator 38 is provided in order to provide hydraulic pressure to the brake caliper 16 and cause the brake caliper 16 to brake. The hydraulic fluid pressure generator 38 includes a hydraulic chamber, or cylinder, 40 and a piston 42. The hydraulic chamber 40 is formed in the non-metallic body 30. The piston 42 moves linearly within the hydraulic chamber 40 (i.e., reciprocates linearly within the hydraulic chamber 40). The piston 42 is mechanically coupled to the operating member 26 by a pin 44 such that operation of the operating member 26 moves the piston 42 through the hydraulic chamber 40 (to the left as seen in FIG. 5). A reservoir 35 is fluidly coupled to the hydraulic chamber 40 by a hydraulic fluid channel 45. The hydraulic fluid pressure generator 38 generates hydraulic pressure through the operation of the piston 42 in an insertion direction of the hydraulic chamber 40.

Figure 6:
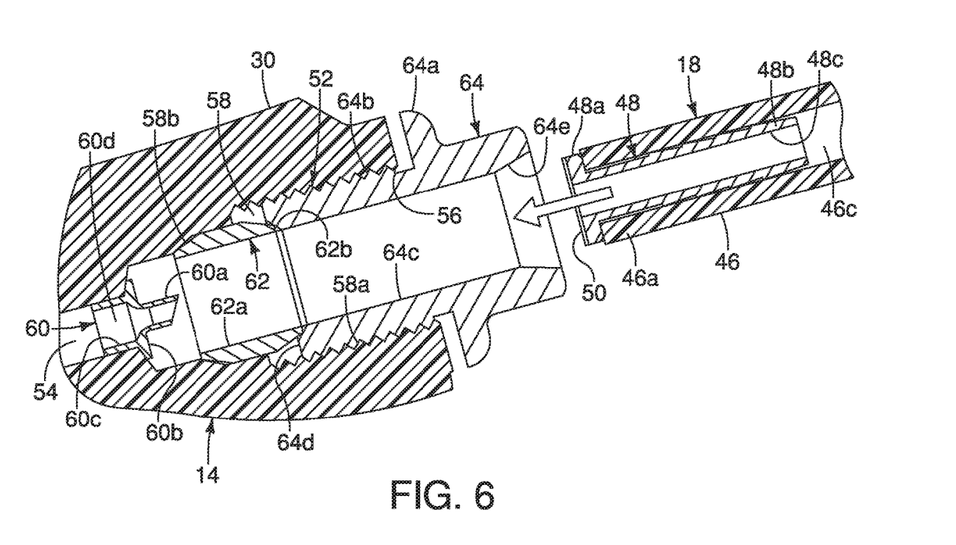
FIG. 6 is a cross sectional view of the hydraulic attachment port of FIG. 4 prior to receiving a hydraulic hose structure.

The piston 42 has a first seal member 42a and a second seal member 42b installed on the outer circumferential surface of the piston 42. The first seal member 42a and the second seal member 42b have, for example, an O-ring shape. The first seal member 42a and the second seal member 42b are provided to seal the gap between the inner circumferential surface of the movement space 40a of the hydraulic chamber 40 and the outer circumferential surface of the piston 42. Alternatively, the piston 42 can have only one seal member. The piston 42 moves within the movement space 40a of the hydraulic chamber 40 in response to a braking operation performed by the operating member 26. Accordingly, the piston 42 is operatively coupled to the operating member 26, and movably disposed in the hydraulic chamber 40 of the non-metallic bracket 14 in response to operation of the operating member 26. A biasing member 26b, such as a spring, biases the piston 42 to a rest position. The hydraulic fluid pressure generator 38 further includes an opening 40c that fluidly communicates with an internal fluid passage 54 (as seen in FIG. 6) to convey hydraulic pressure generated in the hydraulic chamber 40 to the brake caliper 16 through the hydraulic hose structure 18. Operation of the operating member 26 about pivot member 26a pulls the piston 42 through the hydraulic chamber 40 such that a flange 42c of the piston 42 moves from a rest position indicated with a solid line to a brake operated position indicated with a dashed line in FIG. 5.

Figure 7:
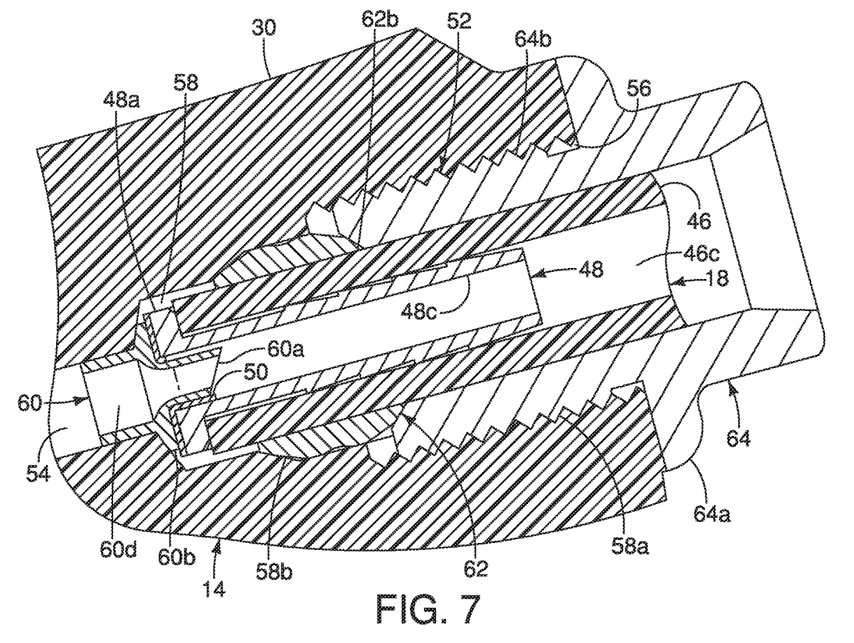
FIG. 7 is a cross sectional view of the hydraulic attachment port of FIG. 6 after receiving the hydraulic hose structure.

Referring now to FIGS. 1 and 4 to 7, the hydraulic brake system 22 will now be discussed. As seen in FIGS. 1, 5 and 6, the brake caliper 16 and the hydraulic chamber 40 are fluidly coupled together by the hydraulic hose structure 18. As best seen in FIG. 6, the hydraulic hose structure 18 is completely prefilled with hydraulic fluid and sealed at each end with a sealing member (50, FIG. 6) prior to shipment. Preferably, the hydraulic hose structure 18 is free of any air or other gas between the sealing members (50, FIG. 6) sealing the opposite ends of the hydraulic hose structure. Moreover, the hydraulic hose structure 18 is partially inserted to the caliper 16 and the hydraulic chamber 40 in the sealed condition such that the hydraulic fluid in the hydraulic hose structure 18 is prevented from flowing into the brake caliper 16 and the hydraulic chamber 40. Furthermore, as best seen in FIG. 7, the hydraulic hose structure 18 is physically unsealed in response to the hydraulic hose structure 18 being fully inserted in the non-metallic body 30 of the non-metallic bracket 14. A substantially similar insertion procedure inserts the hydraulic hose structure 18 in the brake caliper 16. With the hydraulic hose structure 18, the brake caliper 16 and the hydraulic chamber 40, the hydraulic brake system 22 can be assembled in a relatively easy manner without air being trapped in the hydraulic brake system 22.

Referring further to FIGS. 1, 4, 6 and 7, the hydraulic brake system 22 will now be discussed in more detail. As seen in FIG. 6, the hydraulic hose structure 18 basically includes a flexible tube 46 (e.g., hydraulic hose) which forms a filled and sealed hydraulic brake hose. The flexible tube 46 is a conventional flexible tube that is used for conveying hydraulic fluid from the hydraulic chamber 40 (FIG. 5) to the brake caliper 16 under pressure. A first end portion 46a of the flexible tube 46 of the hydraulic hose structure 18 is coupled to the hydraulic chamber 40 and a second end portion 46b of the flexible tube 46 of the hydraulic hose structure 18 is coupled to the brake caliper 16. The flexible tube 46 has an interior passage 46c extending between the openings of the first and second end portions 46a and 46b of the flexible tube 46. As shown in FIG. 6, the first end portion 46a of the flexible tube 46 of the hydraulic hose structure 18 includes a rigid insert 48. The second end portion 46b of the flexible tube 46 of the hydraulic hose structure 18 is similarly configured such that a description thereof is omitted for brevity.

The rigid insert 48 has an annular flange section 48a and a tubular section 48b. A longitudinal passageway 48c passes through the tubular section 48b and the flange section 48a. The outer surface of the tubular section 48b has a plurality of inclined barbs such that the tubular section 48b is securely retained in the interior passage 46c of the flexible tube 46. The rigid insert 48 is designed to be retained in the first end portion 46a of the flexible tube 46 and to provide radial support at the first end portion 46a of the flexible tube 46. Accordingly, the rigid insert 48 is constructed of a rigid material, such as a metallic material. For example, the rigid insert 48 can be formed of a copper or a copper alloy. Of course, any suitable rigid material can be utilized for the rigid insert 48 as needed and/or desired.

As seen in FIG. 6, the hydraulic hose structure 18 also includes a sealing member 50 for sealing the first end portion 46a of the flexible tube 46. The sealing member 50 is preferably formed of a thin flexible sheet of metal foil. The sealing member 50 is adhesively attached to the flange section 48a to overlie an opening of the passageway 46c. Thus, the sealing member 50 forms a seal that seals the opening of the first end of the hydraulic hose structure 18. In other words, in the illustrated embodiment, the opening in the flange section 48a of the rigid insert 48 forms the first opening of the first end portion 46a of the hydraulic hose structure 18. The second end of the hydraulic hose structure 18 is similarly configured such that a description thereof is omitted for brevity.

The non-metallic body 30 has a hydraulic hose attachment port 52 and the internal fluid passage 54, as shown in FIGS. 6 and 7. The hydraulic hose attachment port 52 has an insertion opening 56 disposed at an exterior surface of the non-metallic body 30 and an internal attachment bore 58 extending from the insertion opening 56 towards the internal fluid passage 54. The internal attachment bore 58 includes an internal screw thread, or threaded, portion 58a extending from the insertion opening 56 towards the internal fluid passage 54. A stepped portion 58b is disposed between the internal screw thread portion 58a of the internal attachment bore 58 and the internal fluid passage 54. The internal fluid passage 54 extends from the hydraulic chamber 40 to the internal attachment bore 58, thereby fluidly communicating the hydraulic chamber 40 with the hydraulic hose structure 18.

A rupturing member 60 is disposed in the non-metallic body 30 at a location spaced from the insertion opening 56 of the hydraulic hose attachment port 52, as shown in FIGS. 6 and 7. The rupturing member 60 has a tubular end section 60a, an annular flange section 60b, and a tubular body section 60c. A longitudinal passageway 60d passes through the tubular end section 60a, the flange section 60b, and the tubular body section 60c. The rupturing member 60 is coupled to the internal fluid passage 54, which fluidly communicates with the hydraulic chamber 40. Accordingly, the rupturing member 60 is a tubular rupturing needle having the fluid passageway 60d fluidly connecting the hose attachment port 52 to the internal fluid passage 54. The outer diameter of the annular flange section 60b of the rupturing member 60 is larger than the diameter of the internal fluid passage 54, thereby seating the rupturing member 60 at the end of the internal attachment bore 58. The rupturing member 60 can be disposed in the internal attachment bore 58 in any suitable manner. As seen in FIGS. 6 and 7, the tubular rupturing needle is bonded to the non-metallic body 30. The rupturing member 60 is constructed of a rigid material, such as a metallic material. Of course, any suitable rigid material can be utilized for the rupturing member 60 as needed and/or desired.

A bushing, or olive, 62 is disposed in the internal attachment bore 58, as shown in FIGS. 6 and 7. The bushing 62 is received by the stepped portion 58b of the internal attachment bore 58. The stepped portion 58b limits insertion of the bushing 62 in a direction towards the internal fluid passage 54 because the diameter at the stepped portion 58b of the internal attachment bore 58 is smaller than an outer diameter of the bushing 62. The bushing 62 is disposed between the rupturing member 60 and the insertion opening 56. The bushing 62 has an internal passage 62a passing therethrough, as seen in FIG. 6. The bushing 62 has a tapered contact surface 62b facing the insertion opening 56. Accordingly, the bushing 62 is constructed of a rigid material, such as a metallic material. Of course, any suitable rigid material can be utilized for the bushing 62 as needed and/or desired.

A hose fastening fitting 64 is configured to be received by hydraulic hose attachment port 52. As seen in FIGS. 6 and 7, the hose fastening fitting 64 has a flange portion 64a and a threaded portion 64b extending from the flange portion 64a. The threaded portion 64b is configured to be received by the internal screw thread portion 58a of the attachment bore 58. A longitudinal passage 64c extends through the hose fastening fitting 64. An engagement portion 64d of the hose fastening fitting 64 is configured to engage the bushing 62 when the first end portion 46a of the hydraulic hose structure 18 is secured to the non-metallic body 30. The engagement portion 64d is preferably tapered to facilitate engagement with the contact surface 62b of the bushing 62. The longitudinal passage 64c has an inwardly tapered portion 64e configured to facilitate insertion of the first end portion 46a. The inwardly tapered portion 64e is disposed at an opposite end of the longitudinal passage 64c of the hose fastening fitting 64 from the engagement portion 64b. Accordingly, the hose fastening fitting 64 is constructed of a rigid material, such as a metallic material. Of course, any suitable rigid material can be utilized for the hose fastening fitting 64 as needed and/or desired.

Referring to FIGS. 6 and 7, the sealing member 50 prevents fluid communication between the hydraulic chamber 40 and the interior passage 46c of the flexible tube 46 of the hydraulic hose structure 18 until the sealing member 50 is ruptured by the rupturing member 60. On the other hand, in response to fully inserting the first end portion 46a of the flexible tube 46 into the internal attachment bore 58 of the hydraulic hose attachment port 52 of the non-metallic body 30, the sealing member 50 can be easily ruptured by the rupturing member 60.

Now, a method of assembly of each of the components of the hydraulic brake system 22, and a method of assembly of the hydraulic brake system 22 will be discussed in which the hydraulic brake system 22 can be assembled in a relatively easy manner without air being trapped in the hydraulic brake system 22. Unless otherwise specified, the following method of assembling the hydraulic brake system 22 can be performed in a different order than discussed herein. In other words, the method of assembling the hydraulic brake system 22 is not limited to the following described order of assembly unless otherwise specified. As seen in FIGS. 1 and 6, in the illustrated embodiment, the flexible tube 46 is completely filled with hydraulic fluid and the opposite ends of the flexible tube 46 are sealed with sealing members 50. In particular, the sealing members 50 are attached to the flange sections 48a of the rigid inserts 48 after the flexible tube 46 is completely filled with hydraulic fluid. In this way, the sealing members 50 cover and seal the first and second openings of the first and second end portions 46a and 46b of the flexible tube 46 of the hydraulic hose structure 18 for confining the hydraulic fluid within the flexible tube 46.

As seen in FIG. 6, the rupturing member 60 and the bushing 62 are disposed in the internal attachment bore 58 and the hose fastening fitting 64 is threadably engaged with the internal screw thread portion 58a of the internal attachment bore 58 prior to the first end portion 46a of the flexible tube 46 of the hydraulic hose structure 18 being coupled to the hydraulic hose attachment port 52 of the non-metallic body 30. The flange portion 64a of the hose fastening fitting 64 is spaced from the exterior surface of the non-metallic body 30 prior to securing the hydraulic hose structure 18 thereto.

Next, as seen in FIG. 7, the first end portion 46a of the flexible tube 46 is inserted through the hose fastening fitting 64. The inwardly tapered portion 64e of the hose fastening fitting 64 facilitates insertion of the first end portion 46a of the flexible tube 46 in the hose fastening fitting 64. The first end portion 46a is inserted through the hose fastening fitting 64 and through the bushing 62 until the flange section 48a abuts the annular flange section 60b of the rupturing member 60, thereby causing the tubular end section 60a to penetrate and rupture the seal member 50. In particular, the tubular end section 60a punctures the sealing member 50 and is inserted into the passageway 48c of the rigid insert 48 in response to the first end portion 46a of the flexible tube 46 being coupled to the hydraulic hose attachment port 52. A fluid path is formed from the hydraulic chamber 40 through the internal fluid passage 54 and through the rupturing member 60 to the interior passageway 46c of the flexible tube 46.

The hose fastening fitting 64 is threaded into the internal attachment bore 58 to secure the first end portion 46a of the hydraulic hose structure 18 to the non-metallic body 30 of the non-metallic bracket 14. As the hose fastening fitting 64 is tightened, the engagement portion 64d of the hose fastening fitting 64 engages the tapered contact surface 62b of the bushing 62, as shown in FIG. 7, thereby deforming the bushing 62. The hose fastening fitting 64 is configured to be tightened until the flange portion 64a engages the exterior surface of the non-metallic body 30. The resulting deformation of the bushing 62 causes an inward deformation of the bushing 62, thereby engaging and securely retaining the first end portion 46a of the flexible tube 46 within the hydraulic hose attachment port 52.

A substantially similar procedure is conducted at the second end portion 46b of the flexible tube 46 to secure the second end portion 46b to the brake caliper 16, thereby forming a fluid path between the hydraulic chamber 40 and the brake caliper 16. Thus, the detailed description of the steps of assembling of the brake caliper 16 with the second end part 46b of the hydraulic hose structure 18 will be omitted for the sake of brevity. With this assembling method, the hydraulic brake system 22 can be assembled in a relatively easy manner without air being trapped in the hydraulic brake system 22.

Figure 8:
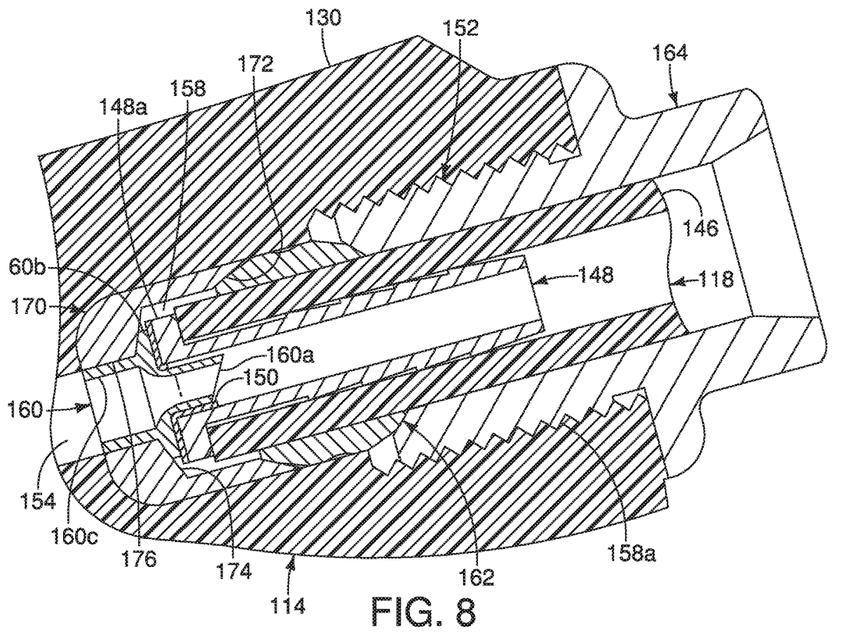
FIG. 8 is a cross sectional view of a hydraulic attachment port of a non-metallic bracket in accordance with another illustrated embodiment in which a rupturing member is received by a tubular insert.

As seen in FIG. 8, a non-metallic bracket 114 for a bicycle hydraulic component in accordance with a second exemplary embodiment of the present invention is substantially similar to the non-metallic bracket 14 for a bicycle hydraulic component of the first exemplary embodiment except for the differences described below. Similar parts are identified with similar reference numerals, except in the 100 series (i.e., 1xx).

A tubular insert 170 is disposed in the attachment bore 158, as shown in FIG. 8. The tubular insert 170 is located between the internal screw thread portion 158a of the attachment bore 158 and the internal fluid passage 154. The tubular insert 170 has an inwardly tapering end 172 configured to receive the bushing 162. A stepped portion 174 of the tubular insert 170 is configured to receive the rupturing member 160. An inner diameter of an opening 176 of the tubular insert 170 is configured to receive the tubular body section 160c of the rupturing member 160. Accordingly, the tubular insert 170 is disposed in the hydraulic hose attachment port 152 with the tubular rupturing needle 160 supported on the non-metallic body 130 by the tubular insert 170.

The tubular insert 170 can be connected to the non-metallic body 130 in any suitable manner, such as by bonding. The rupturing member 160 can be connected to the tubular insert 170 in any suitable manner, such as by bonding. Alternatively, the tubular insert 170 and the tubular rupturing needle 160 can be a unitary one-piece member.

Assembly of the flexible tube 146 to the hydraulic hose attachment port 152 of the non-metallic body 130 is substantially similar to the method described above with respect to the first exemplary embodiment. The tubular insert 170 is constructed of a rigid material, such as a metallic material. Of course, any suitable rigid material can be utilized for the tubular insert 170 as needed and/or desired. Accordingly, the tubular insert 170 can be a metallic member. The rigidity of the tubular insert 170 facilitates deformation of the bushing 162 when deformed by engagement with the hose fastening fitting 164 when the hose fastening fitting 164 is tightened.

Figure 9:
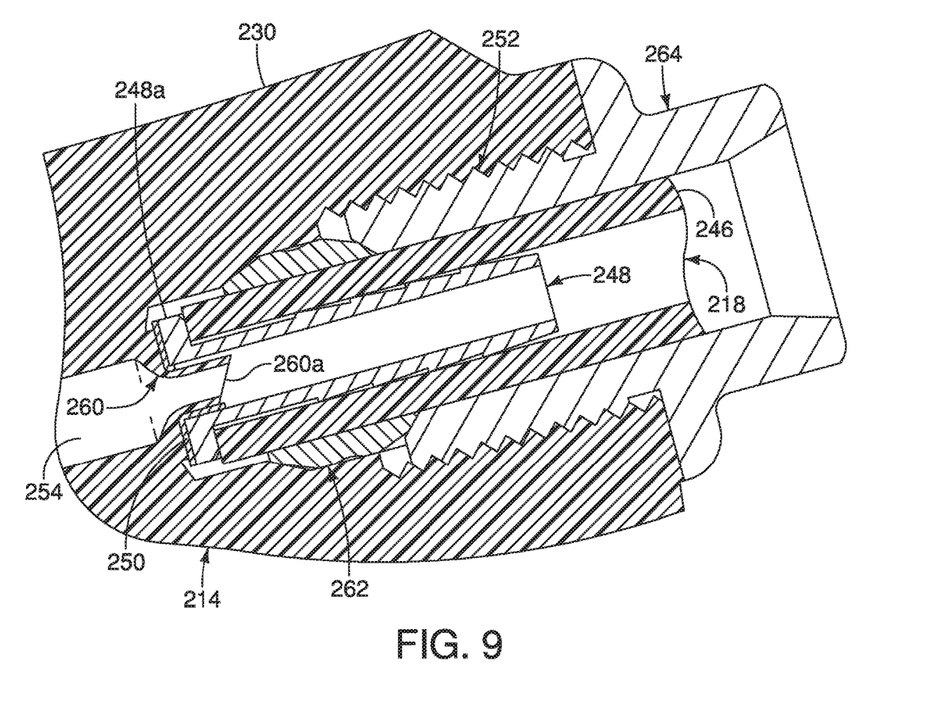
FIG. 9 is a cross sectional view of a hydraulic attachment port of a non-metallic bracket in accordance with still another illustrated embodiment in which a rupturing member is unitarily formed with a non-metallic body of the non-metallic bracket as a unitary one-piece member.

As seen in FIG. 9, a non-metallic bracket 214 for a bicycle hydraulic component in accordance with a third exemplary embodiment of the present invention is substantially similar to the non-metallic bracket 14 for a bicycle hydraulic component of the first exemplary embodiment except for the differences described below. Similar parts are identified with similar reference numerals, except in the 200 series (i.e., 2xx).

The rupturing member 260 is unitarily molded with the non-metallic body 230, as shown in FIG. 9. Accordingly, the tubular rupturing needle 260 and the non-metallic body 230 are a unitary one-piece member that is unitarily molded. The rupturing member 260 is accordingly made of a non-metallic material, such as a resin material.

Assembly of the flexible tube 246 to the hydraulic hose attachment port 252 of the non-metallic body 230 is substantially similar to the method described above with respect to the first exemplary embodiment. By unitarily molding the rupturing member 260 and the non-metallic body 230, a step of disposing the rupturing member 260 in the non-metallic body is not required.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the non-metallic bracket. Accordingly, these directional terms, as utilized to describe the non-metallic bracket should be interpreted relative to a bicycle in an upright riding position on a horizontal surface and that is equipped with the non-metallic bracket. The terms "left" and "right" are used to indicate the "right" when referencing from the right side as viewed from the rear of the bicycle, and the "left" when referencing from the left side as viewed from the rear of the bicycle.

As used herein, the following terms "ring" and "tubular" are not limited to continuous annular members or portions. Rather, the term "ring" and "tubular" as used herein refers to members having an overall "ring" configuration and includes split rings as well as rings having one or more cutouts. Likewise, the term "tubular" as used herein refers to members having an overall "tubular" configuration and includes split tubular members or portions as well as tubular members or portions having one or more cutouts.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A non-metallic bracket for a bicycle hydraulic component, the non-metallic bracket comprising:
a non-metallic body having a hydraulic hose attachment port and an internal fluid passage, the hydraulic hose attachment port having an insertion opening disposed at an exterior surface of the non-metallic body and an internal attachment bore extending from the insertion opening towards the internal fluid passage;
a rupturing member being a tubular rupturing needle that is disposed in the non-metallic body at a location spaced from the insertion opening of the hydraulic hose attachment port; and
a tubular insert disposed in the hydraulic hose attachment port with the tubular rupturing needle supported on the non-metallic body by the tubular insert.

2. The non-metallic bracket according to claim 1, wherein the tubular rupturing needle has a fluid passage fluidly connecting the hose attachment port to the internal fluid passage.

3. The non-metallic bracket according to claim 1, wherein the tubular insert is a metallic member.

4. The non-metallic bracket according to claim 3, wherein the tubular insert and the tubular rupturing needle are a unitary one piece member.

5. The non-metallic bracket according to claim 1, wherein the internal attachment bore of the hydraulic hose attachment port includes a screw thread portion.

6. The non-metallic bracket according to claim 1, wherein the non-metallic body further has a gripping portion and a handlebar receiving recess disposed at an end of the gripping portion.

7. The non-metallic bracket according to claim 6, wherein the non-metallic body further has a pommel portion disposed at an opposite end of the gripping portion from the handlebar receiving recess.

8. The non-metallic bracket according to claim 1, wherein the non-metallic body includes a non-metallic base member and a bracket cover overlying a gripping portion of the non-metallic base member.

9. The non-metallic bracket according to claim 8, wherein the non-metallic base member is made of a resin material.

10. The non-metallic bracket according to claim 9, wherein
the bracket cover is made of an elastic material.

11. A bicycle hydraulic actuating device including the non-metallic bracket according to claim 1, the bicycle hydraulic actuating device further comprising
an operating member movably mounted to the non-metallic bracket; and
a piston operatively coupled to the operating member, and movably disposed in a hydraulic chamber of the non-metallic bracket in response to operation of the operating member.

12. A non-metallic bracket for a bicycle hydraulic component, the non-metallic bracket comprising:
a non-metallic body having a hydraulic hose attachment port and an internal fluid passage, the hydraulic hose attachment port having an insertion opening disposed at an exterior surface of the non-metallic body and an internal attachment bore extending from the insertion opening towards the internal fluid passage; and
a rupturing member disposed in the non-metallic body at a location spaced from the insertion opening of the hydraulic hose attachment port, the rupturing member being a tubular rupturing needle having a fluid passage fluidly connecting the hose attachment port to the internal fluid passage, the tubular rupturing needle and the non-metallic body being a unitary one-piece member that is unitarily molded.

13. A non-metallic bracket for a bicycle hydraulic component, the non-metallic bracket comprising:
a non-metallic body having a hydraulic hose attachment port and an internal fluid passage, the hydraulic hose attachment port having an insertion opening disposed at an exterior surface of the non-metallic body and an internal attachment bore extending from the insertion opening towards the internal fluid passage; and
a rupturing member disposed in the non-metallic body at a location spaced from the insertion opening of the hydraulic hose attachment port, the rupturing member being a tubular rupturing needle having a fluid passage fluidly connecting the hose attachment port to the internal fluid passage, the tubular rupturing needle being bonded to the non-metallic body.

* * * * *